US006077338A

United States Patent [19]

Wallström

[11] Patent Number: 6,077,338

[45] Date of Patent: Jun. 20, 2000

[54] PRINTING INK

[76] Inventor: Eva Wallström, Lyngbyvej 52, 4. tv., DK-2100 Kobenhavn O., Denmark

[21] Appl. No.: 09/138,717

[22] Filed: Aug. 24, 1998

Related U.S. Application Data

[63] Continuation-in-part of application No. 08/433,541, May 2, 1995, Pat. No. 5,798,781.

[51] Int. Cl.[7] .......... C09D 11/02

[52] U.S. Cl. .......... 106/31.6; 106/31.65; 106/31.67; 106/31.86; 106/31.89

[58] Field of Search .......... 106/31.6, 31.67, 106/31.86, 31.65, 31.89

[56] References Cited

U.S. PATENT DOCUMENTS

| | | | |
|---|---|---|---|
| 4,509,982 | 4/1985 | Iijima | 106/31.59 |
| 5,106,417 | 4/1992 | Hauser et al. | 106/31.85 |
| 5,310,778 | 5/1994 | Shor et al. | 106/31.6 |
| 5,512,089 | 4/1996 | Thakkar | 106/31.6 |
| 5,514,207 | 5/1996 | Fague | 106/31.85 |
| 5,637,140 | 6/1997 | Fujioka | 106/31.35 |
| 5,798,781 | 8/1998 | Pedersen et al. | 347/89 |

*Primary Examiner*—Helene Klemanski
*Attorney, Agent, or Firm*—Joseph T. Kivlin, Jr.; Ronald P. Brockman

[57] ABSTRACT

Pigmented ink formulations of different colors, for use in ink jet printers, are optimized with respect to print quality, by the choice of pigments, by controlling the physical characteristics of each pigment dispersion, and by following a particular sequence of manufacturing steps. Controlling surface tension renders the inks compatible with one another; controlling particle size distribution provides flowability; and pigment selection provides resistance to fading.

5 Claims, No Drawings

PRINTING INK

This application is a continuation-in-part of U.S. patent application Ser. No. 08/433,541 filed May 2, 1995, now U.S. Pat. No. 5,798,781 issued Aug. 25, 1998.

TECHNICAL FIELD

This invention relates to new and improved aqueous ink compositions for use in ink jet printing, and to the method of manufacturing such compositions.

BACKGROUND ART

Most prior art ink compositions for use in ink jet printers employed either a dye or a printer which incorporated a mechanical device for keeping pigments dispersed. The dyes, depending on the color, often faded quickly, and the mechanical devices often proved to be less than the ideal, i.e. to develop a pigmented composition which can be used in the ink jet printing systems currently commercially available. The several pigmented compositions which I have found are disclosed in the following patents.

U.S. Pat. No. 5,310,778, of May 10, 1994, assigned on its face to duPont, discloses that the preparation of ink jet inks is improved by using a dispersion of pigment and polymeric dispersant in an aqueous carrier medium, and then employing a milling step. The dispersant is a block copolymer having a molecular weight below 10,000 prepared from acrylates or methacrylates or mixtures thereof. It is said that the particle size ranges from 0.005–1$\mu$. The carrier medium disclosed is water and at least one water-soluble organic solvent, present in the amount of 65–99.5%, based on the total weight of the ink. The pigment is present in an amount up to 30%, and the polymeric dispersant in the amount of 0.1–30%, based on the total weight of the ink composition. The viscosity ranges from 1 to 10 cp. and the surface tension ranges from 30 to 70 dynes/cm, both at 20° C.

Another duPont patent, U.S. Pat. No. 5,418,277, dated May 23, 1995, discloses an ink particularly adapted for ink jet printers. It contains a fluorinated block copolymer prepared from fluorinated oxazoline or oxazine in an amount of 0.005 to 10%. The aim is to get good drying times and print quality. The ink contains an aqueous carrier medium, a colorant and the copolymer, which is a hydrophobic block containing at least one fluorine atom and a hydrophilic block.

duPont U.S. Pat. No. 5,519,085 of May 21, 1996, discloses a triblock coplymer as dispersant, where the triblock consists of a hydrophilic polymer block (A), a polymer block particularly capable of binding solids (B), and a third polymer block which can be hydrophobic or hydrophilic (C). A and C are end blocks.

U.S. Pat. No. 5,537,137 of Jul. 16, 1996 discloses a reactive media ink system where the media has a coating which contains a hydrophilic component and a reactive compound which, upon exposure to an external energy source, becomes more durable.

U.S. Pat. No. 5,281,261 of Jan. 25, 1994 employs a polymerized vinyl aromatic salt, which is grafted to the surface of the pigment particles in an aqueous liquid vehicle comprising water and humectant. The ink has a viscosity of 10 cp. or less.

U.S. Pat. No. 5,514,207 of May 7, 1996 is mainly concerned with low molecular weight (200–800) polyethylene glycol as latency extenders in pigmented ink jet inks. Sulfalone is included, in the range of about 5–40%.

U.S. Pat. No. 5,106,417 of Apr. 21, 1992 discloses an aqueous printing composition for drop-on-demand type in jet printing, where the ink contains 0.5–5% by weight solid pigment preparation (30–70% pigment and 70-30% polyacrylic resin), 2–10% water-dilutable organic solvent (C1–C4 alkanols, lower aliphatic ketones, cellosolves, carbitols, N-methyl-2-pyrrolidone, 2-pyrrolidone, N,N-dimethyl formaldehyde, N,N dimethylacetamide and mixtures thereof), 2–15% humectant (glycol, glycerin, or polyethylene glycol and water. Viscosity ranges of about 2–5 mPas.

U.S. Pat. No. 5,512,089 of Apr. 30, 1996 describes a black ink, where pigment is dispersed in an aqueous medium using a polymeric surfactant. The redispersibility of the ink is achieved by raising the pH to 9–12. The pigment has an average particle size of less than 5$\mu$. The liquid vehicle is selected from the group consisting of a wetting agent, a biocide, deionized water, glycol, a water miscible cosolvent and mixtures thereof. Furthermore, a base of carbon dispersion, polymeric surfactant and water is added to a conventional humectant such as polypropylene glycol.

U.S. Pat. No. 5,316,575 of May 31, 1994 discloses an ink composition suitable for ink jet printing, comprising an aqueous resin solution and an organic pigment, where the composition is substantially free of volatile organic compounds. The ink has a basic pH, a viscosity of 1.6–7 cp. at 25° C., an electrical resistivity from 50–2000 ohm/cm and a sonic velocity from 1200–1300 meters/seconds. The resin is soluble in water at a basic pH and is present in 20–60 wt %.

In none of the above patents is the relationship between surface tension and print quality sufficiently described. Neither is the requirement to achieve durability described. My invention is based on the discovery that it is essential to control surface tension in order to achieve compatibility between inks of different color. Furthermore, the compositions of the present invention achieve durability of at least 6 months outdoor exposure. This promises to broaden the range of applications in the field of ink jet printing.

Some of my earlier work is disclosed in U.S. Pat. No. 5,798,781 dated Aug. 25, 1998, of which the present application is a continuation-in-part. That patent, which is concerned with an improved printing apparatus, also contains a general description of a pigmented ink jet ink composition. It discloses a pigment dispersion, glycol, water, amine, and additives such as a surfactant, a biocide, humectant and anti-foaming agent. The ink disclosed consists of 50–95% water by weight, pigment 1–10 wt-%, cosolvent in the range of 5–35%-wt., and other additives from about 0.5 to 10 wt.-%. It is also disclosed that the surface tension should be controlled.

SUMMARY OF THE INVENTION

The present invention is a water-borne pigmented ink jet ink with very specific properties and produced according to a particular method.

The requirements for a pigment dispersion are as follows:

(a) It should include 30–50% pigment dispersed together with a humectant a pH regulator, and dispersion agent in water. The dispersion aid should be a fatty acid derivative, or a dispersant with the same effect;

(b) The pigment should have a light fastness of 6–8, preferably 7–8 as measured by the Wool scale, according to ISO 2835-1974 (E), assessment of light fastness. This requirement is basically to achieve outdoor durability of 6 months to 2 years for printed matter; and (c) The pigment pastes chosen are black, cyan, magenta and yellow. Spot colors can be produced, such as green, red etc.

The following requirements must characterize the inks:

(d) The surface tension should be in the range of 34–40 mN/m at 23° C.;

(e) The difference in the surface tensions of black, cyan, magenta and yellow should be ±1 unit. Controlling the surface tension in this way means that droplets which are printed have a similar size and that wet on wet printing results in a good print quality. The surface tension of an ink should therefore be equal to or lower than that of the ink just printed, when overprinting different colors, in order to avoid compatibility problems;

(f) The viscosity should be <22 seconds in a Shell cup, 1 or <2 cp. at 23° C. for the bubble jet method; and (g) The pH should preferably be 8–9.

The following major steps should be taken in the production of the ink jet inks of this invention:

(h) A dispersing agent, chosen for the particular pigment paste, is portioned into the paste and stirred before dilution;

(i) The water, preferably deionized, is poured slowly into the paste; cosolvent, humectant and amine is added, and finally an anti-foaming agent and biocide are added, following which the composition is stirred until homogeneous;

(j) The surface tension is regulated to fulfill the requirement of ±1 unit;

(k) The viscosity is controlled to fulfill the requirement of the print method; and (l) The particle size of the pigment in the ink produced should be <1μ, and preferably <0.6μ after filtration and/or sedimentation.

DETAILED DESCRIPTION OF THE INVENTION

In ink jet inks of the present invention, the pigment paste includes dispersion aid, humectant, pH regulator and water, where the pigment content constitutes 30–50% by weight. The pigments used in a 4-color set could be C.I. Pigment Yellow 155, C.I. Pigment Blue 15:3, C.I. Black 7, and C.I. Pigment Red 122. The dispersion aid can be a fatty acid alcohol, polymeric, or a dispersion aid with similar properties. The paste is used in an amount of about 2–15% by weight, preferably 3–12%. Other compositions of pigment paste can be used, but the pigment concentration in the ink should be about 2–6 wt-%.

A second dispersion aid can be chosen from the group of non-ionic fatty acid derivatives, modified polyacrylics, or a dispersion aid with similar properties. The second dispersion aid is necessary in order to permit a great dilution of the pigment paste without severe flocculation with sedimentation. The amount is usually less than 0.4% by weight. A suitable dispersion aid is selected by testing its thickening effect on the pigment paste, where thickening is to be avoided.

The humectant can be glycerin, polypropylene glycol, polyethylene glycol, or a compound with a similar properties. It should have a boiling point of less than about 250° C. The humectant provides the ink with leveling properties on substrates, and serves to prevent drying in the nozzles of the printer, and thus clogging the same. The amount used should be 0–5%, preferably 2–4% by weight.

The pH regulator can be triethanolamine (TEA), aminomethyl propanol (AMP), or similar materials having a boiling point of less than about 150° C. This component serves to stabilize the composition over long periods of time and thus maintain the pigment in a dispersed state. The amount used is normally <0.5% by weight.

Cosolvents found to be operable are glycols such as diethylene glycol or 1,2 propylene glycol, 1,3 propylene glycol, triethyleneglycol and dipropyleneglycol. Such materials serve several functions. They affect the evaporation rate and therefore the drying properties of the ink. They also influence the viscosity of the ink, and can affect the color strength as well. The amount of cosolvent should be up to 15% by wt, preferably 5–10% by wt.

A surfactant is used in order to provide the surface tension in the same range for all ink colors. Preferred materials are, e.g., low molecular weight polyether modified siloxane, a fluorosilicone or acetylene based surfactant. The amount included is normally less than 0.1% by weight.

A biocide must always be used in water based ink compositions in order to avoid bacteria and algae growth. The amount is normally <0.5% by wt.

Other additives such as anti-foam or degassing agents are employed in an amount necessary to prevent entraining air bubbles in the ink. The amount required is normally less than 0.05% by weight.

Water, a major ingredient, should preferably be deionized. It is employed in an amount ranging from 65 to 90% by weight.

The following are some examples of recipes for a 4color set of ink jet inks:

EXAMPLE 1

| Component | Wt-% |
|---|---|
| Pigmatex Yellow 2G; (pigment paste based on Pigment Yellow 14) Sun Chemical, KVK | 8.0 |
| Tego Dispers T740W (non-ionic fatty acid derivative) | 0.25 |
| Diethylene glycol | 15.5 |
| Glycerin, 99.5% | 2.0 |
| Triethanolamine | 0.1 |
| Water | 73.9 |
| Tego Foamex 1488, Tego Chemie Services | 0.001 |
| Promexal X50, Zeneca Biocides | 0.2 |
| Fluorad FC 129, 3M | 0.05 |
| Total | ~100 |

The above product had a surface tension of 35.9 at 23° C. and a pH of 8.9.

EXAMPLE 2

| | |
|---|---|
| Pigmatex Yellow 2GNA; (pigment paste based on Pigment Yellow 155) Sun Chemical, KVK | 9.0 |
| Tego Dispers T740W (non-ionic fatty acid derivative) | 0.3 |
| Diethylene glycol | 12.0 |
| Glycerin, 99.5% | 4.0 |
| Triethanolamine | 0.1 |
| Water | 74.39 |
| Tego Foamex 1488, Tego Chemie Services | 0.001 |
| Promexal X50, Zeneca Biocides | 0.2 |
| Total | ~100 |

The above product had a surface tension of 36.4 at 23° C., and a pH of 8.6.

EXAMPLE 3

| | |
|---|---|
| Pigmatex Fuchsia BW; (pigment paste based on Pigment Red 122) Sun Chemical, KVK | 7.3 |
| Tego Dispers T745W (modified polyacrylate in dipropylene glycol) | 0.2 |
| Diethylene glycol | 8.0 |
| Glycerin, 99.5% | 4.0 |
| Triethanolamine | 0.1 |
| Water | 80.2 |
| Tego Foamex 1488, Tego Chemie Services | 0.002 |
| Promexal X50, Zeneca Biocides | 0.2 |
| Total | ~100 |

The above product had a surface tension of 36.8 at 23° C., and a pH of 8.7.

EXAMPLE 4

| | |
|---|---|
| Pigmatex Fuchsia BW; (pigment paste based on Pigment Red 122) Sun Chemical, KVK | 7.3 |
| Tego Dispers T745W (modified polyacrylate in dipropylene glycol) | 0.16 |
| Diethylene glycol | 2.0 |
| Glycerin, 99.5% | 4.0 |
| 1,3 Propylene glycol | 8.0 |
| Triethanolamine | 0.1 |
| Water | 78.33 |
| Tego Foamex 1488, Tego Chemie Services | 0.001 |
| Promexal X50, Zeneca Biocides | 0.2 |
| Total | ~100 |

The above product had a surface tension of 36.9 at 23° C., and a pH of 8.1.

EXAMPLE 5

| | |
|---|---|
| Pigmatex Cyan 3G; (pigment paste based on Pigment Blue 15:3) Sun Chemical, KVK | 6.0 |
| Tego Dispers T745W (modified polyacrylate in dipropylene glycol) | 0.2 |
| Diethylene glycol | 14.0 |
| Glycerin, 99.5% | 4.0 |
| Triethanolamine | 0.1 |
| Water | 75.5 |
| Tego Foamex 1488, Tego Chemie Services | 0.002 |
| Promexal X50, Zeneca Biocides | 0.2 |
| Total | ~100 |

The above product had a surface tension of 36.1 at 23° C., and a pH of 8.3.

EXAMPLE 6

| | |
|---|---|
| Pigmatex Cyan 3G; (pigment paste based on Pigment Blue 15:3) Sun Chemical, KVK | 4.54 |
| Tego Dispers T745W (modified polyacrylate in dipropylene glycol) | 0.17 |
| Diethylene glycol | 9.6 |
| Glycerin, 99.5% | 2.24 |
| Triethanolamine | 0.1 |
| Water | 83.05 |
| Tego Foamex 1488, Tego Chemie Services | 0.002 |
| Promexal X50, Zeneca Biocides | 0.3 |
| Total | ~100 |

The above product had a surface tension of 37.6 at 23° C., and a pH of 8.4.

EXAMPLE 7

| | |
|---|---|
| Pigmatex Black T; (pigment paste based on Pigment Black 7) Sun Chemical, KVK | 9.5 |
| Tego Dispers T740W (non-ionic fatty acid derivative) | 0.15 |
| Diethylene glycol | 13.5 |
| Glycerin, 99.5% | 4.0 |
| Triethanolamine | 0.1 |
| Water | 72.55 |
| Tego Foamex 1488, Tego Chemie Services | 0.001 |
| Promexal X50, Zeneca Biocides | 0.2 |
| Total | ~100 |

The above product had a surface tension of 35.4 at 23° C., and a pH of 8.8.

The first step in the production procedure for the above ink formulations requires that the pigment paste first be weighed into the production vessel, add the dispersion agent and start to stir. Next, water, glycol and glycerin, which may be premixed, are added slowly while stirring, followed by the addition of half of the anti-foaming agent. Continue stirring until homogeneous.

The next additions are the amine and biocide, requiring continued stirring for 15 to 60 minutes, depending on the equipment used.

Next, samples should be taken to measure at standard temperature, the pH, viscosity and surface tension. If necessary, additions can be made to achieve the necessary physical characteristics. Surface tension agents or anti-foam agents are preferably diluted 1:10 to achieve a more precise addition to the ink.

Finally add the rest of the anti-foaming agent and stir for another 15–60 minutes, depending on the equipment used. Then it is necessary to filter the ink several times with a 5 or 1μ filter. Allow the ink to sediment for a period of 3–6 days and decant into containers. Sedimentation can be avoided with sufficient recircluation of the ink during filtration.

By following the above steps with the specified ink formulations the following characteristics were obtained at 23° C.:

| Property | Yellow | Magenta | Cyan | Black |
|---|---|---|---|---|
| pH | 8.5–9 | 8.5–9 | 8.5–9 | 8.5–9 |
| Viscosity Shell cup 1, sec. | <22 | <22 | <22 | <22 |
| Viscosity, cp. | <2 | <2 | <2 | <2 |
| Surface tension mN/m* | 35–38 | 35–38 | 35–38 | 35–38 |
| Density g/cm$^3$ | 1–1.05 | 1–1.05 | 1–1.05 | 1–1.05 |
| Sedimentation period, days | 3–6 | 3–6 | 3–6 | 3–6 |
| Particle size distribution μ | 0.1–0.67 | 0.07–0.58 | 0–0.49 | 0–0.49 |

*yellow, magenta and cyan should have the same surface tension within ±1. The sedimentation period can be reduced to 2–4 days at 40° C. Sedimentation can be avoided if recirculation of the ink through the filter is optimized. The particle size range for the yellow and magenta has a maximum of about 0.3μ. The normal maximum for black and cyan is <0.1μ. The light fastness of the pigment should be >6 on the Wool scale. The viscosity range is for inks which are useful in bubble jet printing.

*yellow, magenta and cyan should have the same surface tension within ±1. The sedimentation period can be reduced to 2–4 days at 40° C. Sedimentation can be avoided if recirculation of the ink through the filter is optimized. The particle size range for the yellow and magenta has a maximum of about 0.3μ. The normal maximum for black and cyan is <0.1μ. The light fastness of the pigment should be >6 on the Wool scale. The viscosity range is for inks which are useful in bubble jet printing.

Durability was confirmed by the use of an Atlas Xenon Weather testing system. This showed durability of approximately 18 months (about 500 hours) on laminated vinyl. A period of 3 years (approximately 1000 hours) showed fading of the yellow ink, based on Pigment Yellow 14 with a light fastness of about 6. The other inks had only a light fading during the same period, and their light fastness of the pigment was chosen at 7–8 on the wool scale.

INDUSTRIAL APPLICABILITY

The inks made according to the present invention are multipurpose inks which can be used on many different substrates, as long as they can wet and adhere to the same. Some of the preferred substrates are paper, and coated vinyl. Because of their durability, it has been found that these inks can be used outdoors for at least 2 years if the print is laminated. The inks are primarily suited for bubble jet technology, but this concept can be easily modified to be used in other printing heads, where higher viscosities are required.

The disclosure of this invention is intended to be illustrative only. It is not intended to be exhaustive in describing the present invention, and it will be obvious that many changes and refinements can be made within the spirit of the present invention by employing elements other than those recited herein as preferred. For example, one might employ a higher viscosity ink in order to accommodate a different type of printer without departing from the scope of the present invention.

What is claimed is:

1. Aqueous pigmented ink compositions useful in ink jet color printers, wherein each color comprises:

a pigment paste consisting of pigment, dispersion agent, pH regulator and water;

a second dispersion agent selected from the group consisting of non-ionic fatty acid derivatives and modified polyacrylics or copolymers with similar properties;

a glycol cosolvent;

a humectant; and a pH regulator, wherein said pigment was a Wool scale light fastness of 6–8, and wherein each such color composition has a surface tension ranging from 34 to 40 mN/m at 23° C., and wherein the difference in surface tension between such colors is no more than ±1 unit.

2. An aqueous ink composition of claim 1, wherein the glycol cosolvent is selected from the group consisting of diethylene glycol and propylene glycol.

3. An aqueous ink composition of claim 1, wherein the minimum particle size of the pigment ranges from about 0.6 to about 1 micron.

4. An aqueous ink composition of claim 1, wherein the humectant is selected from the group consisting of glycerin and polypropylene glycol, and wherein said pH regulator is an amine selected from the group consisting of triethanolamine, and aminomethyl propanol.

5. An aqueous ink composition of claim 1, wherein a surfactant is also present selected from the group consisting of a low molecular weight polyether modified siloxane, a fluorosilicone and an acetylene based surfactant.

* * * * *